Figure 1:
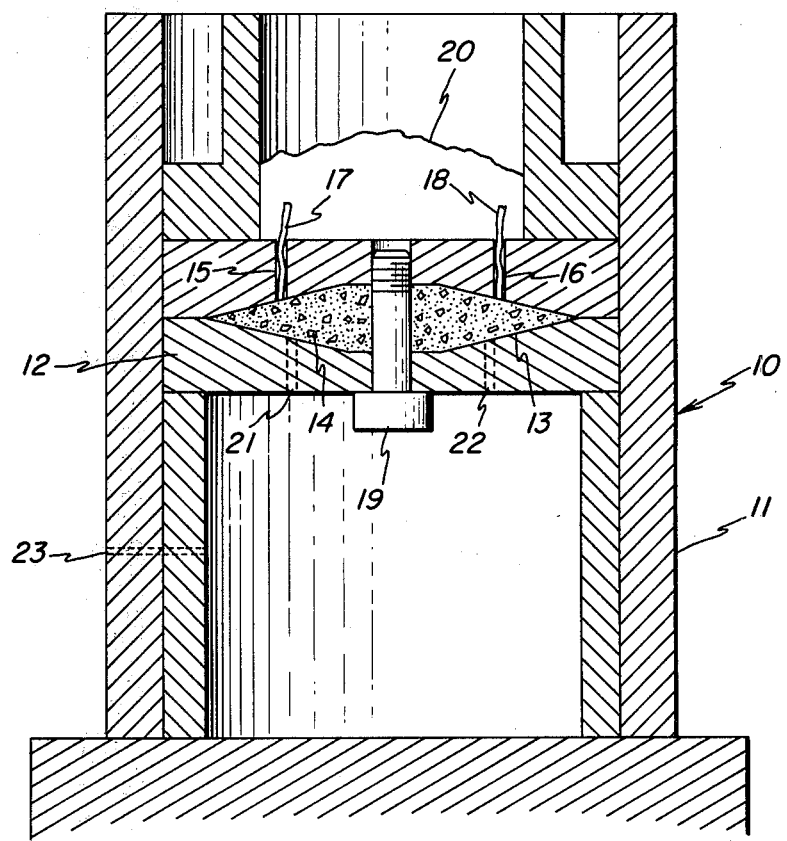

United States Patent [19]

St. Pierre et al.

[11] 4,220,455
[45] Sep. 2, 1980

[54] POLYCRYSTALLINE DIAMOND AND/OR CUBIC BORON NITRIDE BODY AND PROCESS FOR MAKING SAID BODY

[75] Inventors: Philippe D. St. Pierre, Worthington, Ohio; Charles R. Morelock, Ballston Spa, N.Y.; John D. Birle, Galloway, Ohio

[73] Assignee: General Electric Company, Schenectady, N.Y.

[21] Appl. No.: 954,289

[22] Filed: Oct. 24, 1978

[51] Int. Cl.² .......................... B24D 3/04; B24D 3/10
[52] U.S. Cl. ...................................... 51/295; 51/307; 106/44; 264/60; 264/332
[58] Field of Search ................. 51/307, 308, 309, 295; 264/332, 60; 106/44

[56] References Cited

U.S. PATENT DOCUMENTS

| | | | |
|---|---|---|---|
| 2,784,112 | 3/1957 | Nicholson | 264/60 |
| 2,943,008 | 6/1960 | Saunders | 264/60 |
| 3,859,399 | 1/1975 | Bailey et al. | 264/60 |
| 3,982,911 | 9/1976 | Lee | 51/307 |
| 4,110,084 | 8/1978 | Lee et al. | 51/307 |
| 4,124,401 | 11/1978 | Lee et al. | 51/307 |
| 4,141,948 | 2/1979 | Laskow et al. | 264/332 |
| 4,151,686 | 5/1979 | Lee et al. | 51/307 |
| 4,154,787 | 5/1979 | Brown | 264/60 |
| 4,167,399 | 9/1979 | Lee et al. | 51/309 |
| 4,168,957 | 9/1979 | Lee et al. | 51/309 |

Primary Examiner—Donald J. Arnold
Attorney, Agent, or Firm—Jane M. Binkowski; James C. Davis, Jr.; Leo I. MaLossi

[57] ABSTRACT

A shaped confined mass of diamond and/or cubic boron nitride crystals coated with elemental non-diamond carbon, under a partial vacuum, is infiltrated by fluid silicon producing a like-shaped product wherein the crystals are bonded together by a medium comprised of silicon carbide and elemental silicon.

9 Claims, 2 Drawing Figures

POLYCRYSTALLINE DIAMOND AND/OR CUBIC BORON NITRIDE BODY AND PROCESS FOR MAKING SAID BODY

This invention relates to the production of a polycrystalline body comprised of a mass of diamond and/or cubic boron nitride crystals bonded together by a medium comprised of silicon carbide and elemental silicon.

The present process utilizes a partial vacuum, i.e., pressures substantially below the superpressures required by the diamond or cubic boron nitride stable region.

The present polycrystalline body or product can be produced in a variety of configurations and a wide range of sizes of predetermined shape and dimensions. It is useful as an abrasive, cutting tool, nozzle or other wear-resistant part.

Briefly stated, the present process for producing a polycrystalline body of predetermined shape and size comprises providing at least a substantially uniform mixture of diamond and/or cubic boron nitride crystals and a carbonaceous material wherein none of the surfaces of said crystals are exposed significantly and wherein at least a substantial amount of said crystals are enveloped and separated from each other by at least a coherent continuous coating of said carbonaceous material on said crystals, said carbonaceous material being selected from the group consisting of elemental non-diamond carbon, an organic material which completely decomposes at a temperature below 1400° C. to elemental non-diamond carbon and gaseous product of decomposition, and mixtures thereof, said organic material being present in an amount sufficient on decomposition to produce on the crystal surfaces it coats a coherent continuous coating of elemental non-diamond carbon, providing a mold with a cavity of desired size and shape and means for introducing fluid silicon into said cavity and means for maintaining a partial vacuum in said cavity, filling said cavity with said mixture of crystals and carbonaceous material and confining said mixture therein, associating said filled cavity with a mass of silicon, providing the resulting associated structure with a partial vacuum wherein the residual gases have no significant deleterious effect on said associated structure, heating said associated structure in said partial vacuum to a temperature above 1400° C. at which said silicon is fluid and which does not have a significant deleterious effect on said crystals and infiltrating said fluid silicon throughout said confined mixture, said partial vacuum being at least sufficient to remove gas from said confined mixture which blocks said infiltrating fluid silicon, said infiltrating silicon reacting with non-diamond elemental carbon forming silicon carbide, cooling the resulting infiltrated mass of crystals in an atmosphere which has no significant deleterious effect on said infiltrated mass, and recovering the resulting polycrystalline body of said predetermined shape and size wherein the crystals are bonded together by a bonding medium comprised of silicon carbide and elemental silicon and wherein the bonded crystals range from about 1% by volume up to about but less than 80% by volume of the total volume of said body, said body being pore free or containing pores up to less than 5% by volume of said body.

The present shaped polycrystalline body is the product of a like-shaped compact wherein the crystals in the product are not significantly different from the crystals in the compact. Briefly stated, the present polycrystalline body is comprised of crystals selected from the group consisting of diamond, cubic boron nitride, and mixtures or combinations thereof, adherently bonded together by a bonding medium comprised of silicon carbide and elemental silicon, said crystals ranging in size from submicron up to about 2000 microns, the density or volume of said crystals ranging from about 1% by volume to about but less than 80% by volume of said body, said bonding medium being present in an amount ranging up to about 99% by volume of said body, said bonding medium being distributed at least substantially uniformly throughout said body, the portion of said bonding medium in contact with the surfaces of said crystals consisting essentially of silicon carbide, said polycrystalline body being at least substantially pore free.

Figure 2:
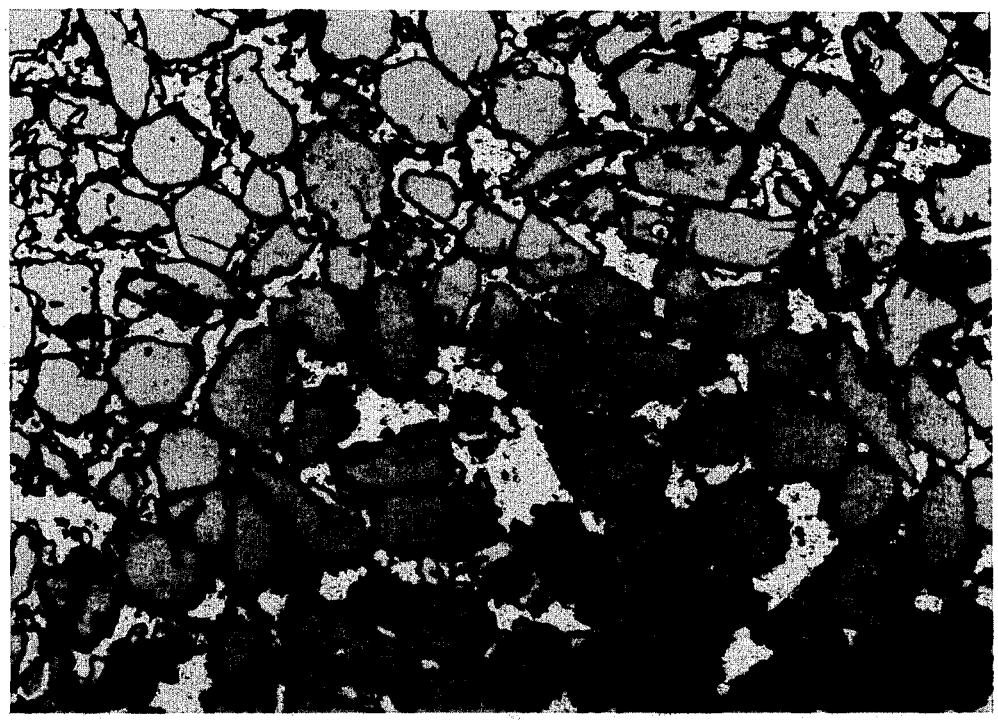

Those skilled in the art will gain a further and better understanding of the present invention from the detailed description set forth below, considered in conjunction with the figures accompanying and forming a part of the specification, in which:

FIG. 1 is a sectional view through an apparatus showing a preferred embodiment for carrying out the present process and FIG. 2 is a photomicrograph (magnified 200×) of a polished section of a polycrystalline diamond body prepared by the present process wherein the diamond content, i.e. volume, was about 55% by volume of the body. Specifically, FIG. 2 shows almost all of the diamond crystals at least enveloped with a continuous phase which is silicon carbide. The lightest colored phase of FIG. 2 is elemental silicon and appears to be substantially surrounded by the silicon carbide phase, i.e. one side of the silicon carbide phase envelopes the diamond crystals whereas the opposite side of the silicon carbide phase is in contact with the elemental silicon phase.

The diamond crystals used in the present process can be natural or synthetic. the diamond and/or cubic boron nitride crystals of the present invention can range in size in largest dimension from submicron up to about 2000 microns, and generally up to about 1000 microns. The particular size or sizes used depends largely on the particular packing or density of crystals desired and also on the resulting body. For most abrasive applications, crystals no greater than about 60 microns are preferred. Preferably, to maximize the packing of the crystals, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the crystals is facilitated by the jet-milling of larger crystals. Preferably, the crystals are chemically cleaned to remove any oxides or other impurities from the surface thereof before use in the present process. This may be accomplished by heating the crystals in hydrogen at about 900° C. for about one hour.

The present carbonaceous material is elemental non-diamond carbon, an organic material, or mixtures thereof. The present organic material decomposes completely at an elevated temperature below 1400° C., and ordinarily decomposes completely at a temperature ranging from about 50° C. to about 1200° C., to produce elemental non-diamond carbon and gaseous product of decomposition.

Representative of the organic material useful in the present process are polymers of aromatic hydrocarbons such as polyphenylene and polymethylphenylene, derivatives of polynuclear aromatic hydrocarbons contained in coal tar such as dibenzanthracene and chrysene. Additional examples of useful organic materials are the epoxy resins such as the reaction product of epichlorohydrin and Bisphenol-A. Still additional examples of useful organic materials are phenolic resins obtained by the condensation of phenol or substituted phenols with aldehydes such as formaldehyde, acetaldehyde, and furfural. Specific examples are the condensation products of phenol-formaldehyde, resorcinol-formaldehyde, aniline-formaldehyde, and cresol-formaldehyde.

In carrying out the present process, the mass of crystals to be used to produce the present polycrystalline body of predetermined size and shape is admixed with the carbonaceous material to produce a uniform or at least a substantially uniform mixture wherein none of the surfaces of the crystals are exposed, or wherein at least none of the surfaces of the crystals are exposed to any significant extent. Also, at least a substantial amount, i.e. at least about 90% by volume, of the crystals of the mixture are enveloped and separated from each other by at least a coherent coating of the carbonaceous material. The surface of the crystal that is not coated with carbonaceous material is not exposed, but it is in direct contact with the surface of another crystal.

A number of techniques can be used to form the present mixture of crystals and carbonaceous material and to shape the resulting mixture to the form and dimensions desired of the final product. For example, the elemental non-diamond carbon can be deposited on the crystals by pyrolytic decomposition of a carbonaceous gas such as methane. Specifically, the crystals can be placed in a furnace provided with a non-oxidizing atmosphere such as hydrogen, nitrogen or an inert gas such as argon. A source of elemental non-diamond carbon such as natural gas or methane is fed into the furnace and the crystals are heated to a temperature sufficient to decompose the methane, ordinarily about 1200° C. whereby a pyrolytic carbon is deposited on the crystals. As used herein the term, elemental non-diamond carbon includes all forms of elemental non-diamond carbon including graphite.

The present organic material is a solid or liquid at room temperature and has no significant deleterious effect on the crystals. If the organic material is a solid, it should be sufficiently softened, or preferably dissolved in a suitable solvent to form a solution, before being admixed with the crystals in order to produce a uniform mixture. The organic material can be admixed with the crystals by a number of techniques including stirring the crystals with the organic material. If desired, the mixture then can be treated, for example subjected to a vacuum or heat, to remove any solvent present and further heated to decompose the organic material producing elemental non-diamond carbon in situ. Preferably, however, the wet, pliable or plastic mixture is shaped or molded to the shape and dimensions desired of the final product, and the resulting shaped mixture treated, if necessary, to retain its shape and dimensions and to impart sufficient mechanical strength for handling. For example, a curing or cross-linking agent can be added to the organic material and the resulting curable organic material admixed with the crystals, shaped to the form and dimensions desired of the final product, and cured sufficiently to retain its form. Shaping of the wet, pliable or plastic mixture can be carried out by a number of techniques, for example, in a temporary mold or in the mold which is to receive the fluid silicon.

A mold with a cavity of desired shape and size is used. The mold should be made of material which has no significant deleterious effect on the present process or product. Preferably, it is made of graphite and preferably it is machinable to the size and shape desired of the final product. Alternatively, the cavity of the mold can be fitted, lined or pressed with a material which is substantially inert with respect to the present process and product, such as hexagonal boron nitride powder, which can be used to produce the final product of desired shape and size. A parting agent, such as a film of hexagonal boron nitride powder, preferably is sprayed on a material such as graphite to enable a clean separation of the final product from the mold.

The mold has means for introducing fluid silicon into the cavity. For example, such means can be holes passing through the mold wall and open to the cavity and to the outside of the mold. Preferably, these infiltration holes are located at the top or in the upper portion of the mold so that the flow of fluid silicon into the cavity is promoted by gravity. These holes can vary in number and diameter depending largely on the extent desired for introducing fluid silicon into contact with the confined mixture.

The number of infiltration holes used is not critical but with an increasing number of infiltration holes, the faster the silicon is introduced into contact with the confined mixture within the mold thereby reducing total infiltration time. On the other hand, the infiltration holes should not be so great in number or diameter as to allow the fluid silicon to be introduced into the cavity to the extent that silicon surrounds the confined mixture since that would entrap gas within the confined mixture and prevent infiltration of the fluid silicon throughout the confined mixture. Infiltration of the fluid silicon should proceed through the confined mixture towards a single external surface or external point of the confined mixture which is sufficient in area to allow removal of pockets of gas in the confined mixture by the partial vacuum thereby allowing the silicon to infiltrate throughout the confined mixture. Infiltration of the fluid silicon through the confined mixture is by capillary action.

Generally, the infiltration holes range from about 10 mils to 125 mils in diameter and holes of larger size provide no significant advantage. Due to the surface tension of elemental silicon which prevents it from passing through such small holes, these holes are provided with a wick, preferably of elemental non-diamond carbon, which passes, i.e. wicks, the fluid silicon through the holes and into the cavity. The smaller the holes, the less likely excess elemental Si/SiC material will be left on the finished product. Ordinarily, any excess Si/SiC material on the surface of the finished product is in the form of a nib or glob which can be ground, machined or polished off in a conventional manner.

The mixture of crystals and carbonaceous material should fill the cavity of the mold in order to produce the final product of desired shape and dimensions since there is no change or no significant change between the volume occupied by the mixture and the final product. The mold, i.e. filled cavity, then is closed. Vents in the mold preferably located in the bottom portion of the mold, are used to evacuate the cavity and maintain the desired partial vacuum therein. The filled mold is associated with a mass of elemental silicon, which preferably is located above the mold.

FIG. 1 shows a cross-section of an associated structure or apparatus 10 illustrating a preferred embodiment for carrying out the present process. Supporting frame 11 is non-metal, preferably is made of graphite and can be machined to the configuration desired. Mold 12 and cavity 13 are provided with a non-metallic connector 19, preferably of graphite, which passes through cavity 13 and which has a threaded end to keep mold 12 closed during silicon infiltration. The mixture of carbonaceous material and crystals 14 fills cavity 13 surrounding connector 19. Holes 15 and 16 are provided with wicks 17 and 18 which pass silicon 20 in fluid form into cavity 13 to infiltrate through mixture 14. Vent holes 21 and 22 allow for the escape of gas from cavity 13 which exit out of vent 23. Vent holes 21, 22 and 23 are used to maintain the required partial vacuum in cavity 13. Connector 19 leaves a hole of like diameter passing through the finished product which has the form of a wheel with a sharp edge and which is useful as a grinding wheel.

The associated structure or apparatus 10 is placed within a furnace and provided with a partial vacuum wherein the residual gases have no significant deleterious effect on said associated structure. Specifically, the furnace chamber is maintained under the partial vacuum which also maintains the associated structure, i.e. the confined mixture within the cavity of the mold and the associated mass of elemental silicon, under partial vacuum. The partial vacuum should be at least sufficient to remove pockets of gas which may be trapped within the confined mixture and which would block the infiltrating fluid silicon thereby leaving pores in the finished product. Generally, such a partial vacuum ranges from about 0.01 torr to about 200 torr, and usually from about 0.01 torr to about 100 torr to insure removal of entrapped gas in the confined mixture.

Ordinarily and as a practical matter, the furnace used is a carbon furnace, i.e. a furnace fabricated from elemental non-diamond carbon. Such a furnace acts as an oxygen getter for the atmosphere within the furance reacting with oxygen to produce CO or $CO_2$ and thereby provides a non-oxidizing atmosphere, i.e. the residual gases have no significant deleterious effect on the crystals or infiltrating silicon. The present infiltration cannot be carried out in air because diamond graphitizes rapidly in air above 800° C. and the liquid silicon would oxidize to form solid silica before any significant infusion by silicon of the confined mixture occurred. In such instance where a carbon furnace is not used, it is preferable to have an oxygen getter present in the furance chamber, such as elemental non-diamond carbon, in order to insure the maintenance of a non-oxidizing atmosphere. Alternatively, such non-oxidizing atmosphere, or atmosphere which has no significant deleterious effect on the associated structure within the furnace, can be provided by a sufficiently high partial vacuum, i.e. about $10^{-2}$ torr to 20 torr.

The confined mixture and silicon are heated to infiltration temperature which is above 1400° C. When the carbonaceous material is an organic material, such organic material decomposes completely at a temperature below 1400° C. producing elemental non-diamond carbon and gaseous product of decomposition. The mold-confined mass or mixture that is infiltrated by the silicon consists essentially of crystals, i.e. diamond, cubic boron nitride or combinations thereof, and elemental non-diamond carbon.

The elemental non-diamond carbon in the mold-confined mixture must be at least slightly porous to allow the silicon to infiltrate therethrough. Specifically, the elemental non-diamond carbon may range in porosity but its density should not exceed 0.96 g/cc. If the elemental non-diamond carbon is more dense than 0.96 g/cc, fluid elemental silicon may not penetrate it, or if it should penetrate such a dense elemental non-diamond carbon, the resulting body will puff up and be distorted. The maximum porosity of the elemental non-diamond carbon is that which maintains the shape of the mold-confined mixture with none of the surfaces of the crystals being exposed significantly. Generally, the maximum porosity for the elemental non-diamond carbon is about 50% by volume of the total volume of the elemental non-diamond carbon present in the mold-confined shaped mixture.

The pores in the mold-confined mixture consisting essentially of the crystals and elemental non-diamond carbon should be distributed uniformly or at least significantly uniformly throughout the mixture to prevent formation of excessively large pockets of elemental silicon which may lower the mechanical properties of the resulting polycrystalline product thereby limiting its applications. The pores can range in size, and generally can range up to about 2000 microns, but preferably are not larger than the size of the crystals used. For best results, the pores are submicron in size.

The porosity of the shaped mixture of crystals and elemental non-diamond carbon is determinable by a number of conventional techniques.

The present infiltration is carried out at a temperature above 1400° C. at which silicon becomes fluid and which has no significant deleterious effect on the crystals. For cubic boron crystals infiltration temperatures significantly higher than about 1450° C. are not useful since they are likely to cause conversion to hexagonal boron nitride. On the other hand, for diamond crystals, temperatures higher than 1550° C. provide no significant advantage. By a temperature at which silicon becomes fluid it is meant herein a temperature at which the silicon is readily flowable. The fluid silicon is highly mobile and highly reactive with elemental non-diamond carbon, i.e. it has an affinity for elemental non-diamond carbon, wetting it and reacting with it to form silicon carbide. Specifically, when silicon is at its melting temperature, which has been given in the art to range from about 1412° C. to about 1430° C., it has a high viscosity, but as its temperature is raised, it becomes less viscous and at a temperature about ten degrees higher than its melting point, it becomes fluid. The temperature at which the silicon is fluid is the temperature at which it will infuse or infiltrate through the capillary-size passages, interstices or voids of the present mold-confined mixture of crystals and elemental non-diamond carbon. With increase in temperature, the flowability of the fluid silicon increases resulting in a faster rate of reaction.

Sufficient silicon is infiltrated throughout the mold-confined mass or mixture, infusing or infiltrating through the voids or pores of the mixture by capillary action to react with the total amount of elemental non-diamond carbon present in the confined mixture forming silicon carbide, and also to fill any pores or voids which may remain after formation of the silicon carbide producing an integral, strongly bonded and at least substantially pore-free body. Specifically, silicon carbide occupies more volume than elemental non-diamond carbon thereby reducing porosity, and any pores remaining after formation of silicon carbide are filled during infiltration with elemental silicon. Also, during infiltration the silicon reacts with the elemental non-diamond carbon coating on the surfaces of the crystals forming a protective adherent coating of silicon carbide on the diamond surfaces and causing no loss or no significant loss of crystal and no change or no significant change in the shape and dimensions of the crystals. The resulting infiltrated mass is cooled in an atmosphere which has no significant deleterious effect on said infiltrated mass, preferably it is furnace cooled in the partial vacuum to about room temperature, and the resulting polycrystalline body is recovered.

The period of time for full infiltration by the silicon is determinable empirically and depends largely on the size of the shaped mixture, and frequently, infiltration by the fluid silicon through the mold-confined shaped mixture is completed within about 15 minutes.

A number of techniques can be used to determine the extent to which silicon has infiltrated the mold-confined shaped mixture of crystals and elemental non-diamond carbon. For example, the mold can be cooled to room temperature, opened and the extent of silicon infiltration observed.

In another technique the composition and weight of the final polycrystalline body can be determined from the porosity, amount of elemental non-diamond carbon and amount of crystals present in a shaped mixture comprised of the crystals and elemental non-diamond carbon. Specifically, the content of silicon carbide in the polycrystalline product can be calculated from the amount of elemental non-diamond carbon in the mixture. The porosity remaining after silicon carbide reaction is completed will be the volume occupied by elemental silicon. The weight of the final polycrystalline body is the total, or approximately the total, of the weights of its crystal content, its silicon carbide content and its elemental silicon content. As a result, during infiltration, any gain in weight by the silicon-infiltrated mixture can be used to determine the extent of infiltration.

The present polycrystalline body is comprised of crystals selected from the group consisting of diamond, cubic boron nitride and combinations thereof adherently bonded together by a bonding medium comprised of silicon carbide and elemental silicon, said crystals ranging in size from submicron to about 2000 microns, the density of said crystals ranging from about 1% by volume up to about but less than 80% by volume of said body, frequently up to about 75% by volume of said body, said bonding medium being present in an amount ranging up to about 99% by volume of said body, said bonding medium being distributed at least substantially uniformly throughout said polycrystalline body, the portion or surface of said bonding medium in direct contact with the surfaces of the bonded crystals being silicon carbide. The present polycrystalline body is pore free or at least substantially pore free.

The amount of silicon carbide in the present polycrystalline body depends on the amount of elemental non-diamond carbon in the mold-confined mixture, and this is illustrated by the following equation:

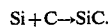

$$Si + C \rightarrow SiC.$$

On the other hand, the amount of elemental silicon in the polycrystalline body depends on the porosity or pores remaining after the total amount of elemental non-diamond carbon is reacted to form silicon carbide. However, the present polycrystalline body always contains silicon carbide in an amount of at least about 1% by volume of the body and elemental silicon in an amount of at least about 1% by volume of the body.

The present polycrystalline body usually is free of elemental non-diamond carbon phase. However, it may contain non-diamond elemental carbon phase in an amount ranging up to about 5% by volume of the body provided such non-diamond elemental carbon phase is sufficiently distributed throughout the body so as not to have any significant deleterious effect on its mechanical properties. The presence of the elemental non-diamond carbon phase is detectable by standard metallographic techniques such as, for example, by optically examining a polished cross-section of the body, or by transmission electron microscopy on a thin section of the body.

The present polycrystalline body is void or pore-free or at least substantially pore-free, i.e. it may contain voids or pores in an amount less than about 5% by volume of the body dedending on its particular application providing such voids or pores are small, preferably less than 1 micron, and sufficiently uniformly distributed throughout the body so that they have no significant deteriorating effect on its mechanical properties. The void or pore content of the present body is determinable by standard metallographic technique such as, for example, optically examining a polished cross-section of the body.

One particular advantage of this invention is that the present polycrystalline body can be produced directly in a wide range of sizes and shapes which heretofore could not be manufactured or required expensive and tedious machining because of the very nature of the material. For example, the present body can be as long as several inches, or as long as desired, and be of very complex geometry, and specifically, it can be produced in the form of a tube or a hollow cylinder, a ring, a sphere or a bar having a sharp point at one end. Also, since the present polycrystalline body is produced in a predetermined configuration of predetermined dimensions, it requires little or no machining.

A portion of the polycrystalline body produced by the present invention can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the polycrystalline body can be used for direct machining. Alternatively, the present polycrystalline body can be mechanically clamped to a lathe tool for direct machining by the exposed surface of the polycrystalline body.

The invention is further illustrated by the following examples tabulated in Table I where, unless otherwise stated, the procedure was as follows:

Commercially pure silicon was used for infiltration.

The "Epon 828" used is a resin formed from the reaction of epichlorohydrin and Bisphenol A, which is a liquid at room temperature and which has an epoxide equivalent of 185–192. Epon 828 decomposes completely below 1300° C.

The curing agent used was diethylenetriamine, a liquid commonly called DTA which cures Epon 828 at room temperature thereby solidifying it.

In each Example of Table I, the given crystals were coated with a very thin coating of pyrolitic carbon deposited by the decomposition of natural gas. Specifically, for this coating procedure, the crystals were spread out in a graphite crucible and placed in a graphite furnace which was a vacuum bell jar. The furnace was evacuated down to 0.003 torr and heated to 1200° C. Methane from a natural gas line was admitted into the furnace maintained at a pressure of 50 torr for about five minutes. The furnace was then shut off and the crystals were furnace-cooled to room temperature in the 0.003 torr vacuum. The crystals were then re-spread in the crucible, returned to the furnace and the coating procedure was repeated to insure a complete coating of the crystals.

Examination of the coated crystals showed them to have a continuous, coherent, very adherent coating of elemental non-diamond carbon, i.e. over 99% by volume of the crystals were separated from each other by the carbon coating, and none of the surfaces of the crystals were exposed. Since the deposited coating of elemental non-diamond carbon on the crystals was very thin, i.e. it ranged in thickness from about 500 Angstroms to about 1000 Angstroms, it did not add to the weight of the crystals significantly, and therefore, the given crystal weight in Table I is that of these carbon-coated crystals.

The given amounts of elemental non-diamond carbon, Epon 828 and crystals, i.e. carbon-coated crystals, were stirred at room temperature along with 0.1 gram curing agent and sufficient methylethylketone, i.e. about 0.1 g to 0.2 g, to form a substantially uniform mixture. Methylethylketone is a solvent for the Epon 828 resin and distributes it throughout the mixture.

The resulting mixture was manually shapable and was then shaped in a Teflon mold and heated in air to about 800° C. for about 1 hour to evaporate methylethylketone therefrom and accelerate curing of the resin. The cured shaped mixture was removed from the mold without sticking, in one piece, being held together by the cured resin. It had the dimensions given in Table I, i.e. that of a uniform bar in Example 1 and that of a uniform disc in Examples 2–6.

In each of the Examples the shaped mixture was fitted into a graphite mold, wherein all of the surfaces had been sprayed with hexagonal boron nitride.

The associated structure or apparatus for carrying out the silicon infiltration was similar to that shown in FIG. 1. Specifically, a solid graphite cylinder was used with a cavity drilled into its upper end portion for holding silicon and a cavity drilled in its lower end portion for use as a mold cavity. The mold cavity was drilled to correspond to the shape and dimensions of the shaped mixture so that there was no significant free space within the mold cavity when it was closed. An infiltration hole, about 60 mils in diameter, was drilled substantially perpendicularly between the two cavities connecting them. A wick of elemental non-diamond carbon fiber, about 500 mils long and about 50 mils in diameter, was positioned within the infiltration hole to extend into the upper cavity, but to be just in contact with the shaped mixture in the mold cavity. The shaped mixture was placed within the mold cavity which was then closed with a graphite plate forming a mold which was not air tight and therefore could be ventilated without a vent hole. The graphite plate was held in place by carbon filament or graphite bars. A mass of granular elemental silicon was placed in the upper cavity.

The resulting associated structure was placed in a graphite vacuum furnace which was evacuated to about 0.1 torr and maintained at about 0.1 torr during silicon infiltration and subsequent furnace-cooling to room temperature. The residual gases in the furnace were non-oxidizing.

The furnace was heated to the given infiltration temperature and maintained at such temperature for the given period of time. The power was then cut off and the structure was furnace-cooled to room temperature.

The amount of infiltrating silicon was sufficient to completely infiltrate throughout the mold-confined mixture of crystals and elemental non-diamond carbon, and completion of the silicon infiltration in the given time was based on experience and results with similar runs.

In each example, the polycrystalline body was recovered from the mold without sticking. The remains of the infiltration wick were machined off. The resulting polycrystalline body was in the form of a uniform bar or disc as given in Table I.

Density of the Polycrystalline Body was determined by means of water displacement.

A portion of a surface of each polycrystalline body was polished on a cast iron scaife.

In each example the polished surface of the polycrystalline body was examined optically magnified about 500 times under a microscope to determine its microstructure.

Since the amount of crystals remained the same or did not change significantly from that in the shaped mixture, the volume fraction of crystals in the polycrystalline body was calculated and also was based on the appearance of the polycrystalline body.

The volume fraction of silicon carbide in the polycrystalline body was calculated based only on the amount of elemental non-diamond carbon added to the shaped mixture, since in all of these examples the amount of elemental non-diamond carbon deposited as coating on the crystals and that produced from "Epon 828" was not significant.

The volume fraction of elemental silicon in the polycrystalline body was calculated and also was based on the pore-free or substantially pore-free appearance of the polycrystalline body of each example.

TABLE I

| | SHAPED MIXTURE | | | | | | Silicon Infiltration | |
|---|---|---|---|---|---|---|---|---|
| | | | | Elemental Non-Dia. Carbon Added | Epon 828 | Dimensions | Temp. | Time at Infil. Temp. |
| Ex. No. | Type | CRYSTAL Mesh | Micron | wt. (g) | wt. (g) | wt. (g) | (inches) | (°C.) | (min.) |

TABLE I-continued

| Ex. No. | Crystal | | | | | | | |
|---|---|---|---|---|---|---|---|---|
| 1 | Diamond | 35/40 | 500/420 | 1.1 | 1.5 (crushed fiber) | 0.15 | 0.25 × 0.5 × 1.0 | ~1500 | ~15 |
| 2 | Diamond | 80/100 | 177/149 | 1.12 | 0.25 (carbon black) | 0.1 | 0.5 in diam. & 0.19 thick | ~1500 | ~10 |
| 3 | Diamond | 325 | 44 | 1.12 | 0.15 (crushed fiber) | 0.1 | 0.5 in diam. & 0.18 thick | ~1500 | ~10 |
| 4 | Diamond | 35/40 200/230 | 500/420 74/62 | 1.36 0.2 | 0.15 (crushed fiber) | 0.15 | 0.5 in diam. & 0.2 thick | ~1500 | 10 |
| 5 | Cubic Boron Nitride | 60/80 | 250/177 | 1.3 | 0.18 (crushed fiber) | 0.12 | 0.5 in diam. & 0.2 thick. | ~1450 | 8 |
| 6 | Mixture of Cubic Boron Nitride & Dia. | 35/40 (Dia.) 60/80 (Cubic Boron Nitride) | 500/420 250/177 | 0.7 (Dia.) 0.7 (Cubic Boron Nitride) | 0.19 (crushed carbon cloth) | 0.15 | 0.5 in diam. & 0.2 thick | ~1450 | 20 |

| | | POLYCRYSTALLINE BODY | | | | |
|---|---|---|---|---|---|---|
| | | Composition in Volume % of Body | | | | |
| Ex. No. | Density g/cc | Crystal | SiC | Elemental Si | Elemental Non-Dia. Carbon | Porosity |
| 1 | 3.1 | ~15 (Dia.) | ~75 | ~9 | ≲1 | ≲1 |
| 2 | 3.21 | ~52 (Dia.) | ~42 | ~6 | ~0 | ~0 |
| 3 | 3.24 | ~55 (Dia.) | ~27 | ~16 | ~1 | ~1 |
| 4 | 3.31 | ~70 (Dia.) | ~24 | ~6 | <1 | <1 |
| 5 | 3.2 | ~60 (Cubic Boron Nitride) | ~29 | ~10 | <1 | ~1 |
| 6 | 3.15 | 30 (Dia.) 30 (Cubic Boron Nitride) | ~30 | ~8 | ~1 | ~1 |

All of the examples of Table I illustrate the present invention.

In each example, the recovered polycrystalline body was integral and had dimensions which were not different or not significantly different from the given dimensions of the shaped mixture.

In each example, optical examination of the external polished surface of the polycrystalline body showed it to be uniformly and completely infiltrated and the bonding medium appeared to be uniformly distributed. There appeared to be no loss or no significant loss of diamond or cubic boron nitride crystals, and no change or no significant change in the shape and dimensions of the diamond or cubic boron nitride crystals. Elemental silicon was seen in a shiny phase, submicron in size, and substantially uniformly distributed. In addition, the polished surfaces of the polycrystalline bodies appeared to be free or substantially free of elemental non-diamond carbon phase.

A polished section of the polycrystalline body of Example 3 is shown in FIG. 2. Specifically, FIG. 2 shows almost all of the diamond crystals at least surrounded with a continuous phase which is silicon carbide. The lightest colored phase of FIG. 2 is elemental silicon and appears to be substantially surrounded by the silicon carbide phase, i.e. one side of the silicon carbide phase envelopes the diamond crystals whereas the opposite side of the silicon carbide phase is in contact with the elemental silicon phase.

Because of their particular volume fraction of crystals, the polycrystalline body produced in Example 1 would be useful as a saw blade segment, whereas the polycrystalline bodies of Examples 2–6 would be useful as a wear surface or cutting tool.

EXAMPLE 7

A polycrystalline diamond body was prepared in substantially the same manner as disclosed for Example 3 and had substantially the same composition.

Its abrasion resistance was tested by means of a lathe turning test. Specifically, the cylindrical polycrystalline diamond body was ground on the outside diameter to 0.5065 inches o.d. and surface ground to a thickness of 0.178 inches. The finished tool, i.e. the ground polycrystalline diamond body, was mounted in a clamping tool holder at a slightly negative rake angle. A workpiece consisting of a cylinder of "Black Diamond" (Ebonite filled with silicon sand), 5.6 inches in diameter and 24 inches long was used for testing. The workpiece was rotated at 293 rpm. The depth of cut was set to 0.030 inches and the traverse rate to 0.005 inches per revolution. After 16.2 minutes of machining by the polycrystalline diamond tool, a wear land, 0.010 inches long formed on the edge of the diamond tool. Its abrasion resistance factor, calculated by dividing the machining time in minutes by the length of the wear land, was 16.2. The polycrystalline diamond tool was rotated to expose a fresh cutting edge and the lathe turning test was repeated with identical results.

The tool was then rotated again to expose fresh diamond cutting edge and the lathe turning test was repeated again. After 32.4 minutes of machining, an abrasion resistance factor of 18.0 was produced. The tool was then rotated again to expose a fresh diamond cutting edge, and the lathe turning test was repeated. After 64.8 minutes of machining, an abrasion resistance factor of 36.0 was produced.

EXAMPLE 8

A polycrystalline diamond body was prepared in substantially the same manner as set forth in Example 1 and it had substantially the same composition.

The polycrystalline body was abraded manually against a piece of sandstone to expose the diamond. Its usefulness as a saw blade segment was determined by attaching the polycrystalline diamond body in a clamping device to the blade of a laboratory scale frame saw. The saw was then set in motion reciprocating a distance of 2⅜ inches, 60 times per minute. The workpiece, a block of Somerset(Ohio) Marble, was fed up through the blade at an initial rate of 0.005 inches per minute and gradually increased to 0.25 inches per minute. Free cutting of the workpiece by the diamond body was observed throughout until the diamond body fractured due to stress from the clamping device. Similar results were obtained in sawing Tarn granite (0.005 inches/minute only).

What is claimed is:

1. A process for producing a polycrystalline body of predetermined shape and size which consists essentially of providing at least a substantially uniform mixture of crystals selected from the group consisting of diamond, cubic boron nitride and combinations thereof and a carbonaceous material wherein none of the surfaces of said crystals are exposed significantly and wherein at least a substantial amount of said crystals are enveloped and separated from each other by at least a coherent continuous coating of said carbonaceous material on said crystals, said carbonaceous material being selected from the group consisting of elemental non-diamond carbon, an organic material which completely decomposes at a temperature below 1400° C. to elemental non-diamond carbon and gaseous product of decomposition, and mixtures thereof, said organic material being present in an amount sufficient on decomposition to produce on the crystal surfaces it coats a coherent continuous coating of elemental non-diamond carbon, providing a mold with a cavity of desired size and shape and means for introducing fluid silicon into said cavity and means for maintaining a partial vacuum in said cavity, filling said cavity with said mixture of crystals and carbonaceous material and confining said mixture therein, associating said mixture in said filled cavity with a mass of solid silicon via said means for introducing fluid silicon into said cavity, providing the resulting associated structure with a partial vacuum wherein the residual gases have no significant deleterious effect on said associated structure, heating said associated structure in said partial vacuum to a temperature above 1400° C. at which said silicon is fluid and which has no significant deleterious effect on said crystals, introducing said fluid silicon to said confined mixture via said means for introducing fluid silicon into said cavity and infiltrating said fluid silicon throughout said confined mixture, said partial vacuum being at least sufficient to remove gas from said confined mixture which blocks said infiltrating fluid silicon, said infiltrating silicon reacting with non-diamond elemental carbon forming silicon carbide, cooling the resulting infiltrated mass of crystals in an atmosphere which has no significant deleterious effect on said infiltrated mass, and recovering the resulting polycrystalline body of said predetermined shape and size wherein the crystals are bonded together by a bonding medium comprised of silicon carbide and elemental silicon and wherein the bonded crystals range from about 1% by volume up to about but less than 80% by volume of the total volume of said body, said body being pore free or containing pores up to less than about 5% by volume of said body.

2. The process of claim 1 wherein said crystals are size-graded ranging from about 1 micron to about 60 microns.

3. The process of claim 1 wherein said crystals are diamond.

4. The process of claim 1 wherein said crystals are cubic boron nitride.

5. The process of claim 1 wherein said crystals are a combination of diamond and cubic boron nitride.

6. A shaped polycrystalline body comprised of a mass of crystals selected from the group consisting of diamond, cubic boron nitride and combinations thereof adherently bonded together by a bonding medium consisting essentially of silicon carbide and elemental silicon wherein the volume of said silicon carbide and said silicon each is at least about 1% by volume of said polycrystalline body, said crystals ranging in size from submicron up to about 2000 microns, the volume of said crystals ranging from about 1% by volume to about but less than 80% by volume of said body, said bonding medium being present in an amount ranging up to about 99% by volume of said body, said bonding medium being distributed at least substantially uniformly throughout said body, the portion of said bonding medium in contact with the surface of said crystals being silicon carbide, said body being at least substantially pore free.

7. The polycrystalline body according to claim 6 wherein the crystals are diamond.

8. The polycrystalline body according to claim 6 wherein said crystals are cubic boron nitride.

9. The polycrystalline body according to claim 6 wherein said crystals are a combination of diamond and cubic boron nitride.

* * * * *